US009565578B2

(12) United States Patent
Chu et al.

(10) Patent No.: US 9,565,578 B2
(45) Date of Patent: Feb. 7, 2017

(54) METHOD FOR COLLECTING AND AGGREGATING NETWORK QUALITY DATA

(71) Applicant: Google Inc., Mountain View, CA (US)

(72) Inventors: Melodie Chu, Sunnyvale, CA (US); Lawrence Jonathan Brunsman, Mountain View, CA (US); Christian Sonntag, San Francisco, CA (US); Brian Clair Williammee, Palo Alto, CA (US); Tyler Williams, San Francisco, CA (US)

(73) Assignee: Google Inc., Mountain View, CA (US)

( * ) Notice: Subject to any disclaimer, the term of this patent is extended or adjusted under 35 U.S.C. 154(b) by 133 days.

(21) Appl. No.: 14/308,341

(22) Filed: Jun. 18, 2014

(65) Prior Publication Data

US 2015/0373560 A1 Dec. 24, 2015

(51) Int. Cl.
*H04W 4/00* (2009.01)
*H04W 24/02* (2009.01)
*H04W 24/10* (2009.01)

(52) U.S. Cl.
CPC ............. *H04W 24/02* (2013.01); *H04W 24/10* (2013.01)

(58) Field of Classification Search
CPC ....................................................... H04W 4/00
USPC ................................................. 370/252, 338
See application file for complete search history.

(56) References Cited

U.S. PATENT DOCUMENTS

| | | | |
|---|---|---|---|
| 6,128,490 A | 10/2000 | Shaheen et al. | |
| 6,381,315 B1 | 4/2002 | Nhaissi | |
| 6,633,761 B1 | 10/2003 | Singhal et al. | |
| 7,180,898 B2 | 2/2007 | Yoshida et al. | |
| 7,509,131 B2 | 3/2009 | Krumm et al. | |
| 7,809,360 B2 | 10/2010 | Agrawal et al. | |
| 7,848,292 B2 | 12/2010 | Bl et al. | |
| 8,131,317 B2 | 3/2012 | Lee | |
| 8,155,081 B1 | 4/2012 | Mater et al. | |

(Continued)

FOREIGN PATENT DOCUMENTS

| | | |
|---|---|---|
| EP | 1885144 A2 | 2/2008 |
| EP | 2244501 A1 | 10/2010 |

(Continued)

OTHER PUBLICATIONS

Ge et al., "A History-Based Handover Prediction for LTE Systems" Computer Network and Multimedia Technology. CNMT. International Symposium on , vol., No., pp. 1,4, (Jan. 18-20, 2009).

(Continued)

*Primary Examiner* — Farah Faroul
(74) *Attorney, Agent, or Firm* — Faegre Baker Daniels LLP

(57) ABSTRACT

A system and method are provided for collecting wireless network quality parameters. The wireless network quality parameters are collected from wireless networks by a client device in communication with the wireless network. The client device reports the wireless network quality parameters to a server. The server collects wireless network quality parameters from a plurality of client devices and analyzes the wireless network quality parameters from the plurality of client devices to determine a network quality for the particular wireless networks. The network quality is stored in a network quality database maintained by the server. The server provides access to the network quality for devices with permission to access the wireless network quality database.

25 Claims, 6 Drawing Sheets

(56) References Cited

U.S. PATENT DOCUMENTS

| | | | |
|---|---|---|---|
| 8,165,581 B2 | 4/2012 | Joshi et al. | |
| 8,200,217 B2 | 6/2012 | Kanade et al. | |
| 8,391,192 B2 | 3/2013 | Prakash et al. | |
| 8,477,645 B2 | 7/2013 | Scherzer et al. | |
| 8,484,568 B2 | 7/2013 | Rados et al. | |
| 8,542,637 B2 | 9/2013 | Bandhakavi et al. | |
| 8,565,766 B2 | 10/2013 | Scherzer et al. | |
| 8,590,023 B2 | 11/2013 | Gupta et al. | |
| 8,909,250 B1* | 12/2014 | Wang | H04W 64/00 455/456.1 |
| 2002/0169716 A1 | 11/2002 | Johnson et al. | |
| 2003/0227893 A1* | 12/2003 | Bajic | H04L 49/70 370/338 |
| 2004/0246920 A1 | 12/2004 | Savolainen | |
| 2005/0245269 A1 | 11/2005 | Demirhan et al. | |
| 2006/0098625 A1 | 5/2006 | King et al. | |
| 2006/0193295 A1 | 8/2006 | White et al. | |
| 2007/0037550 A1 | 2/2007 | Armstrong | |
| 2007/0064684 A1 | 3/2007 | Kottilingal | |
| 2007/0064894 A1 | 3/2007 | Armstrong et al. | |
| 2007/0127391 A1 | 6/2007 | Goodman | |
| 2007/0147317 A1 | 6/2007 | Smith et al. | |
| 2008/0002668 A1 | 1/2008 | Asokan et al. | |
| 2008/0009279 A1 | 1/2008 | Sakawa | |
| 2008/0122690 A1* | 5/2008 | Wan | G01C 21/206 342/357.42 |
| 2008/0233977 A1 | 9/2008 | Xu et al. | |
| 2008/0282080 A1* | 11/2008 | Hyndman | H04L 41/5003 713/150 |
| 2009/0061862 A1 | 3/2009 | Alberth, Jr. et al. | |
| 2009/0168757 A1 | 7/2009 | Bush | |
| 2009/0298467 A1 | 12/2009 | Zohar | |
| 2010/0124886 A1* | 5/2010 | Fordham | H04B 17/382 455/67.11 |
| 2010/0172323 A1 | 7/2010 | Rexhepi et al. | |
| 2010/0304737 A1 | 12/2010 | Jain et al. | |
| 2011/0096673 A1 | 4/2011 | Stevenson et al. | |
| 2011/0216694 A1 | 9/2011 | Plasberg et al. | |
| 2011/0265156 A1* | 10/2011 | Bombay | G06F 21/34 726/5 |
| 2011/0269423 A1 | 11/2011 | Schell et al. | |
| 2011/0306318 A1 | 12/2011 | Rodgers et al. | |
| 2012/0094653 A1 | 4/2012 | Okuda | |
| 2012/0108206 A1 | 5/2012 | Haggerty | |
| 2012/0135711 A1* | 5/2012 | Jabara | H04L 63/0876 455/411 |
| 2012/0178488 A1 | 7/2012 | Jonker et al. | |
| 2012/0195223 A1 | 8/2012 | Raleigh | |
| 2012/0196644 A1* | 8/2012 | Scherzer | H04W 72/02 455/524 |
| 2012/0282915 A1 | 11/2012 | Haynes et al. | |
| 2013/0155842 A1 | 6/2013 | Moore et al. | |
| 2013/0165117 A1 | 6/2013 | Narayanan | |
| 2013/0203438 A1 | 8/2013 | Shin | |
| 2013/0225169 A1 | 8/2013 | Farnsworth et al. | |
| 2013/0227647 A1 | 8/2013 | Thomas et al. | |
| 2013/0230023 A1 | 9/2013 | Gray et al. | |
| 2013/0303156 A1 | 11/2013 | Astrom et al. | |
| 2014/0071895 A1 | 3/2014 | Bane et al. | |
| 2014/0080539 A1 | 3/2014 | Scherzer et al. | |
| 2014/0104102 A1* | 4/2014 | Enge | G01S 19/03 342/357.42 |
| 2014/0127992 A1 | 5/2014 | Kuscher et al. | |
| 2014/0148100 A1 | 5/2014 | Kim et al. | |
| 2014/0148170 A1 | 5/2014 | Damji et al. | |
| 2014/0179340 A1* | 6/2014 | Do | G01S 13/765 455/456.1 |
| 2014/0211648 A1 | 7/2014 | Rahmati et al. | |
| 2014/0213256 A1 | 7/2014 | Meylan et al. | |
| 2014/0281532 A1* | 9/2014 | Jin | H04L 63/0428 713/168 |
| 2014/0362713 A1* | 12/2014 | Agarwal | H04W 24/08 370/252 |
| 2014/0370910 A1* | 12/2014 | Natucci, Jr. | H04W 4/022 455/456.1 |
| 2015/0030157 A1* | 1/2015 | Segev | G01S 5/0027 380/270 |
| 2015/0098393 A1 | 4/2015 | Tofighbakhsh et al. | |
| 2015/0127939 A1 | 5/2015 | Mazandarany et al. | |
| 2015/0141037 A1* | 5/2015 | Saha | H04W 4/021 455/456.1 |
| 2015/0195362 A1* | 7/2015 | Ong | H04L 67/141 709/225 |
| 2015/0281198 A1 | 10/2015 | Lee et al. | |
| 2015/0312881 A1* | 10/2015 | Agrawal | H04W 64/00 455/456.1 |

FOREIGN PATENT DOCUMENTS

| | | | |
|---|---|---|---|
| WO | | 2002-041580 A1 | 5/2002 |
| WO | | 2004-047476 A1 | 6/2004 |
| WO | | 2006-005947 A1 | 1/2006 |
| WO | WO | 2006/005947 A1 | 1/2006 |
| WO | | 2011-162688 A1 | 12/2011 |
| WO | WO | 2011/162688 A1 | 12/2011 |
| WO | WO | 2013/020598 A1 | 2/2013 |
| WO | WO | 2013/044359 A1 | 4/2013 |
| WO | | 2014-011094 A1 | 1/2014 |

OTHER PUBLICATIONS

Gemalto N.V. "Card Admin," Document Reference D1225357A (Jun. 2, 2011).

dicoda.com. "Multi IMSI," dicoda.com (Jun. 20, 2013) (available at: https://web.archive.org/web/20130620191315/http://www.dicoda.com/introduction/imsi).

Higginbotham, Stacey. "Is Apple About to Cut Out the Carriers?" gigaom.com (Oct. 27, 2010) (available at: http://gigaom.com/2010/10/27/is-apple-about-to-cut-out-the-carriers/).

Tobias, Marc Weber. "The Split Personality Cell Phone That Saves You Money on Overseas Calling," forbes.com (Aug. 20, 2013) (available at: http://onforb.es/14gMCe4).

"Circuit-switched fallback. The first phase of voice evolution for mobile LTE devices." Qualcomm Incorporated, 2012 11 pages.

CMSG. "Reprogrammable SIMs: Technology, Evolution and Implications," Final Report (Sep. 25, 2012) (available at: http://stakeholders.ofcom.org.uk/binaries/research/telecoms-research/reprogrammable-sims.pdf).

"Feature Requests—Republic Wireless Wiki," http://republic-wireless.wikia.com/wiki/Feature_Requests 1 page.

"Republic Wireless," http://republicwireless.com 2 pages.

"T-Mobile's 4G Network—Check Your Coverage—T-Mobile Blazing Fast 4G Coverage" 9 pages.

"What is VoLTE | Voice Over LTE | Tutorial," radio-electronics.com, http://www.radio-electronics.com/info/cellulartelecomms/lte-long-term-evolution/voice-over-lte-volte.php 5 pages.

Korean Intellectual Property Office, International Search Report and the Written Opinion in International Application No. PCT/US2014/057709 Dec. 29, 2014.

CMCC, "Network Selection for WLAN/3GPP Radio Interworking," 3GPP Draft; R2-130973 Network Selection for WLan 3GPP Radio Interworking, 3rd Generation Partnership Project (3GPP). Mobile Competence Centre; 650. Route Des Lucioles; F-06921 Sophia-Antipolis Cedex, vol. RAN WG2, No. Chicago, USA; Apr. 15, 2013 to Apr. 19, 2013; Apr. 4, 2013, XP050699128, Retrieved from the Internet: URL:http://www.3gpp.org/ftp/tsg_ran/WG2_RL2/TSGR2_81bis/Docs/.

Qualcomm Europe, "Framework for UE SON Reports," 3GPP TSG RAN WG3& SA WG5, No. S5-090017 Jan. 12, 2008 (Jan. 12, 2008), pp. 1-5, XP002588155, Retrieved from the Internet: URL:http://www.3gpp.org/ftp/tsg_sa/wg5_tm/Ad-hoc_meetings/2009-01-RAN3/Docs.

Qualcomm Europe et al., "Text proposal for UE Measurements for Minimizing Drive Tests" 3GGPP Draft; R2093175, 3rd Generation Partnership Project (3GPP). Mobile Competence Centre; 650.

(56) References Cited

OTHER PUBLICATIONS

Route Des Lucioles; F-06921 Sophia-Antipolis Cedex; France, No. San Francisco, USA; Apr. 28, 2009, Apr. 28, 2009 (Apr. 28, 2009), XP050340887.

European Patent Office, International Search Report and the Written Opinion in International Application No. PCT/US2015/030775 (Aug. 21, 2015).

Bircher et al., "An Agent-Based Architecture for Service Discovery and Negotiation in Wireless Networks," University of Bern, Wired/Wireless Internet Comms. (WWIC), Jan. 21, 2004.

Silverman, Dwight, "Thinking of changing cellphone carriers? Check this app first," http://blog.chron.com/techblog/2011/06/thinking-of-changing-cellphone-carriers-check-this-app-first/, Houston Chronicle Techblog, Jun. 15, 2011.

VoLGA FORUM, "VoLGA Stage 2 V1.7.0: Voice over LTE via Generic Access," Jun. 14, 2010.

Qualcomm Europe et al., "Text Proposal for UE Measurements for Minimizing Drive Tests," 3GPP TSG-RAN WG2 Meeting #66, R2-093175, May 4-8, 2009.

Qualcomm Europe, "Framework for UE SON Reports," 3GPP TSG RAN WG3 & SA WG5, S5-090017, Jan. 12-13, 2008.

CMCC, "Network Selection for WLAN/3GPP Radio Interworking," 3GPP TSG-RAN WG2 Meeting 81#bis, R2-130973, Apr. 15-19, 2013.

Nikravesh et al., "Mobile Network Performance from User Devices: A Longitudinal, Multidimensional Analysis," Passive and Active Measurement: 15th International Conference, PAM 2014, Mar. 10-11, 2014.

Levy, Marlyn, "Best-Practice Authentication Methods for Wi-Fi Offload," http://www.acurixnetworks.com/single-post/2013/05/20/BestPractice-Authentication-Methods-For-WiFi-Offload, May 20, 2013.

* cited by examiner

METHOD FOR COLLECTING AND AGGREGATING NETWORK QUALITY DATA

BACKGROUND

Client devices, such as a mobile phone or laptop, often have a plurality of available wireless networks to choose from in order to achieve network connectivity. Typically, an available wireless network is selected by a client device or a user of the client device. However, the client device and the user do not have access to certain historical network quality parameters that will inform a decision to select a wireless network to use for achieving the best network quality.

Additionally, while there are an abundance of wireless networks available for use by client devices, each individual client device may only be aware of the presence of a particular wireless network once the individual client device is within signal range of an access point of the wireless network. In this regard, the individual client device may be unable to determine what wireless network to attach to until it comes into signal range of the access point of the wireless network. This issue is exacerbated as the client device moves between various wireless network coverage areas. Accordingly, the wireless network selection process is inefficient.

BRIEF SUMMARY

One embodiment provides a method of providing network quality parameters for a wireless network from a client device, the method comprising: communicating with a wireless network over a network interface of the client device; measuring, by a client application residing on the client device, the network quality parameters for the wireless network; providing, by the client application, the network quality parameters to a reporting module of the client device; collecting, by the reporting module, network information associated with the network quality parameters; and sending, by the reporting module, the network information and the network quality parameters to a server over the wireless network.

Another embodiment provides a method of providing a database of wireless networks based on network quality, the method comprising: receiving network quality parameters for a wireless network collected by a client device attached to the wireless network; receiving network information associated with the network quality parameters; aggregating the network quality parameters with previously received network quality parameters for the wireless network based on the network information; processing the network quality parameters and the previously received network quality parameters to determine a wireless network quality for the wireless network.

Yet another embodiment provides A non-transitory computer readable storage device for collecting network quality parameters by a client application residing on a client device, the non-transitory computer readable storage device having computer executable instructions for performing the steps of: communicating with a wireless network over a network interface of the client device; measuring, by a client application residing on the client device, the network quality parameters for the wireless network; providing, by the client application, the network quality parameters to a reporting module of the client device; collecting, by the reporting module, network information associated with the network quality parameters; and sending, by the reporting module, the network information and the network quality parameters to a server over the wireless network.

Other aspects, objectives and advantages of the disclosure will become more apparent from the following detailed description when taken in conjunction with the accompanying drawings.

BRIEF DESCRIPTION OF THE SEVERAL VIEWS OF THE DRAWING(S)

The accompanying drawings incorporated in and forming a part of the specification illustrate several aspects of the present disclosure and, together with the description, serve to explain the principles of the disclosure. In the drawings.

DETAILED DESCRIPTION

Client devices, such as a mobile phone or laptop, often have a plurality of available wireless networks to choose from in order to achieve network connectivity. Typically, an available wireless network is selected by a client device or a user of the client device. However, the client device and the user do not have access to certain historical network quality parameters that will inform a decision to select a wireless network to use for achieving the best network quality.

Additionally, while there are an abundance of wireless networks available for use by client devices, each individual client device may only be aware of the presence of a particular wireless network once the individual client device is within signal range of an access point of the wireless network. In this regard, the individual client device may be unable to determine what wireless network to attach to until it comes into signal range of the access point of the wireless network. This issue is exacerbated as the client device moves between various wireless network coverage areas. Accordingly, the wireless network selection process is inefficient.

Therefore, to improve wireless network selection efficiency, quality parameters relating a wireless network quality can be collected over time and utilized to determine which wireless network a client device will attach to out of a plurality of available wireless networks. Embodiments of the disclosure described herein provide a system to collect and analyze quality parameters and other network and geographic information related to wireless networks. Using the collected quality parameters and network and geographic information, the system is able to build a searchable database providing wireless network quality in various geographic areas for various wireless networks where quality parameters and wireless network information is collected. In certain embodiments, the wireless network will be searchable based on wireless network identification information and a geographic location of a client device. The system is then able to provide access to the database in order to support a variety of uses, such as making an informed decision on wireless network selection or planning future data downloads based on a route of travel of the client device.

Figure 1:
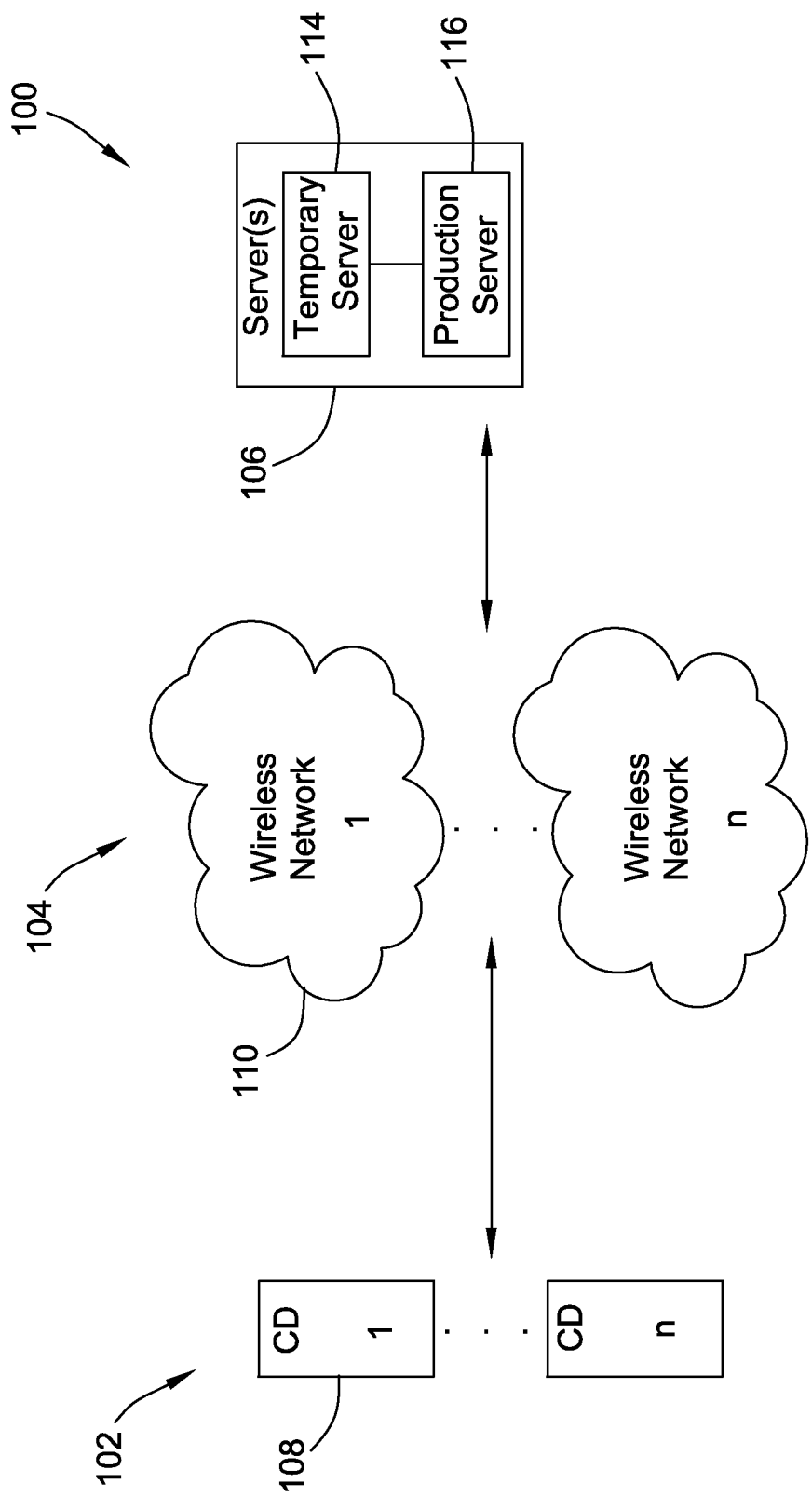
FIG. 1 is a block diagram illustrating a system for collecting wireless network data, according to an example embodiment.

FIG. 1 illustrates a block diagram of an example communications system 100 in which various embodiments of the present disclosure may be implemented. In the communications system 100 depicted in FIG. 1, a plurality of client devices 1-n 102 are shown in relation to a plurality of wireless networks 1-n 104, which in turn is shown in relation to a server 106. The plurality of client devices 102 collect quality parameters from the plurality of wireless networks 104, which the plurality of client devices 102 has available while they travel around various geographic locations. The quality parameters collected by the plurality of client devices 102 are then transferred to the server 106, which analyzes the quality parameters to build a database of summarized quality parameters in each geographic location. The server 106 then shares this database with each individual client device, such as client device 108, comprising the plurality of client devices 102. The plurality of client devices 102 can then make an informed decision on which wireless network of the plurality of wireless networks 104 to connect.

The quality parameters may include only a single parameter or a multitude of parameters. For instance, the quality parameters may include at least one of a bit error rate, a signal strength such as a received signal strength indicator (RSSI), a network latency as determined by the time it takes from an HTTP request to an HTTP response, and network throughout measured in bytes/second and used to determine a time it takes to transmit a known amount of data packets.

The plurality of client devices 102 may be a mobile device such as a smart phone, a tablet computer, a laptop computer, a watch with a computer operating system, a personal digital assistant (PDA), a video game console, a wearable or embedded digital device(s), or any one of a number of additional devices capable of communicating over the plurality of wireless networks 104.

The plurality of wireless networks 104 include but are not limited to Wide Area Networks (WAN) such as a Long Term Evolution (LTE) network, a Global System for Mobile Communications (GSM) network, a Code Division Multiple Access (CDMA) network, a Wideband Code Division Multiple Access (WCDMA) network, Wireless Local Area Networks (WLAN) such as the various Wi-Fi networks operating under the various IEEE 802.11 standards, or any other kind of wireless network. The plurality of wireless networks 104 allow the plurality of client devices 102 to communicate with the server 106. For example, client device 108 may transmit information to the server 106 and receive information from the server 106 through wireless network 110. Further, the plurality of wireless networks 104 may include a set of cell towers, as well as a set of base stations and/or mobile switching centers (MSCs). In some embodiments, the plurality of wireless networks 104 may include various cell tower/base station/MSC arrangements.

As an aside, whether because of technological limitations or geographic limitations, not every client device of the plurality of client devices 102 will be able to connect to each of the plurality of wireless networks 104. In this manner, each individual client device from the plurality of client devices 102 will only report quality parameters from the individual wireless networks the individual client device is able to communicate with. For ease of description, embodiments of the disclosure described herein will refer to the plurality of client devices 102 collecting quality parameters from the plurality of data networks 104 even though it is understood that not every client device of the plurality of client devices 102 will communicate with every wireless network.

Further, server 106 is illustrated as a single server. However, server 106 could be implemented as a plurality of servers servicing specified geographic locations, or server 106 could be implemented as a cloud server. The singular server 106 is illustrated for ease of description. This singular server illustration is not intended to limit the disclosure contained herein. Also, the server 106 is illustrated as including a temporary server 114 and a production server 116. The temporary server 114 and the production server 116 may be included as software servers within server 106 or as separate servers communicatively coupled in a cluster of servers 106. The temporary server 114 functions to receive data reported from the plurality of client devices 102 and temporarily store the data for holding and analyzing the data prior to transfer to the production server 116. Once the production server 116 receives the data, such as the quality parameters, from the temporary server 114, the production server 116 aggregates the data and stores it in a searchable database (see FIG. 4).

As an aside, in certain embodiments, the data stored in the database by the production server 116 is aggregated and stored for a finite period of time, such as one day, one week, one month, three months or longer. In this regard, the network quality as determined by the quality parameters for the plurality of wireless networks 104 will be built upon recently collected relevant data.

As the discussion of the various devices, systems and methods contained herein progresses, at points only a singular client device 108 or a singular wireless network 110 may be discussed. In this regard, client device 108 or wireless network 110 are only referenced as being generally representative of the plurality of client devices 102 and the plurality of wireless networks 104, respectively. Therefore, the functionality of client device 108 can be imported to the plurality of client devices 102, and the functionality of wireless network 110 can be imported to the plurality of wireless networks 110.

The plurality of client devices 102 may collect further data beyond the quality parameters associated with the plurality of wireless networks 104. In certain embodiments, the plurality of client devices 102 will also collect wireless network identification information utilized to uniquely identify a wireless network and an access point for that wireless network.

In certain embodiments, client device 108 may transmit information to the server 106 and receive information from the server 106 through wireless network 110, and wireless network 110 may be a Wi-Fi wireless network. In this instance, the client device 108 would collect identification information including at least one of a Basic Service Set Identification (BSSID) and a Service Set Identification (SSID). In certain embodiments, the client device 108 will collect both the SSID and the BSSID, which will uniquely identify an access point for the Wi-Fi wireless network 110. However, in other embodiments the Wi-Fi wireless network 110 may indicate that it does not want to be uniquely identified. For instance, the SSID may contain the term "_nomap" in the name field, which indicates that the particular Wi-Fi wireless network 110 does not wish to have data uniquely identifying the network collected. In this embodiment, the client device 108 will only collect BSSID information, such as the MAC address of the wireless network 110 access point.

In certain embodiments, client device 108 may transmit information to the server 106 and receive information from the server 106 through wireless network 110, and wireless network 110 may be a cellular wireless network. In this instance, the client device 108 would collect identification information that uniquely identifies an access point for the cellular wireless network 110. For instance, the identification information could be an identifier of a cellular base station, such as a CellID. If the cellular wireless network 110 is a CDMA network, then the identification information could include a NetworkID, a SystemID and/or a BasestationID. If the cellular wireless network 110 is a GSM or WCDMA network, then the identification information could include a Mobile Country Code (MCC), a Mobile Network Code (MNC) and/or a Location Area Code (LAC). If the cellular wireless network 110 is an LTE network, then the identification information could include a MCC, a MNC, a Tracking Area Code (TAC) and/or a physical Cell Identity (CI).

Further, in certain embodiments, the identification information may indicate a type of cellular wireless network. For instance, the identification information may further include information regarding whether the wireless network 110 is an Evolution Data-Optimized (EVDO) network, a High Speed Packet Access (HSPA) network or an LTE network.

Whether the wireless network 110 is a Wi-Fi wireless network or a cellular wireless network, the identification information is associated with the quality parameters for the wireless network 110 and sent to the server 106. In this regard, the quality parameters are associated with a unique wireless network or unique access point of the wireless network.

Additionally, in certain embodiments, the client device 108 may collect location data that indicates a location of the client device 108 while collecting the quality parameters. In certain embodiments, the location data includes a latitude, a longitude and a timestamp of when the location data is determined. Generally, the latitude and longitude are collected to a certain precision that allows the location of client device 108 to be determined to within 5-100 meters. In doing so, the latitude and longitude data will be coarsened to the sixth decimal digit. One such technique to coarsen the longitude and latitude data is to multiply a raw latitude or longitude measurement by 1,000,000 and truncate any places in the resulting number beyond six digits after the decimal.

If collected, the location data will be associated with the quality parameters and identification information and sent to the server 106. In this regard, a location of the client device 108 is associated with the quality parameters and the identification information such that a map of wireless network quality can be determined based on the data in database.

As an aside, the location data will only be collected if a user of the client device 108 has indicated that location data may be collected from the client device 108. In this regard, if the user configures the client device 108 such that location data is not to be collected, then location data for the client device 108 will not be collected.

Additionally, other types of network information can be collected by the client device 108. For instance, the client device 108 may collect a timestamp of when the quality parameters were collected and associate that timestamp with the quality parameters as they are sent to the server 106. For clarity, the timestamp collected at the time of collecting the quality parameters may be different than a timestamp collected at the time of determining a location of the client device 108.

In certain embodiments, the client device 108 may also collect data indicating a name and version of an application residing on the client device 108, where the application is utilized to collect the quality parameters. Also, the client device 108 may collect data indicating whether the wireless network 110 is a captive portal or a tethered network. The data indicating whether the wireless network 110 is a captive network or a tethered portal may be in the form of a true/false bit.

Figure 2:
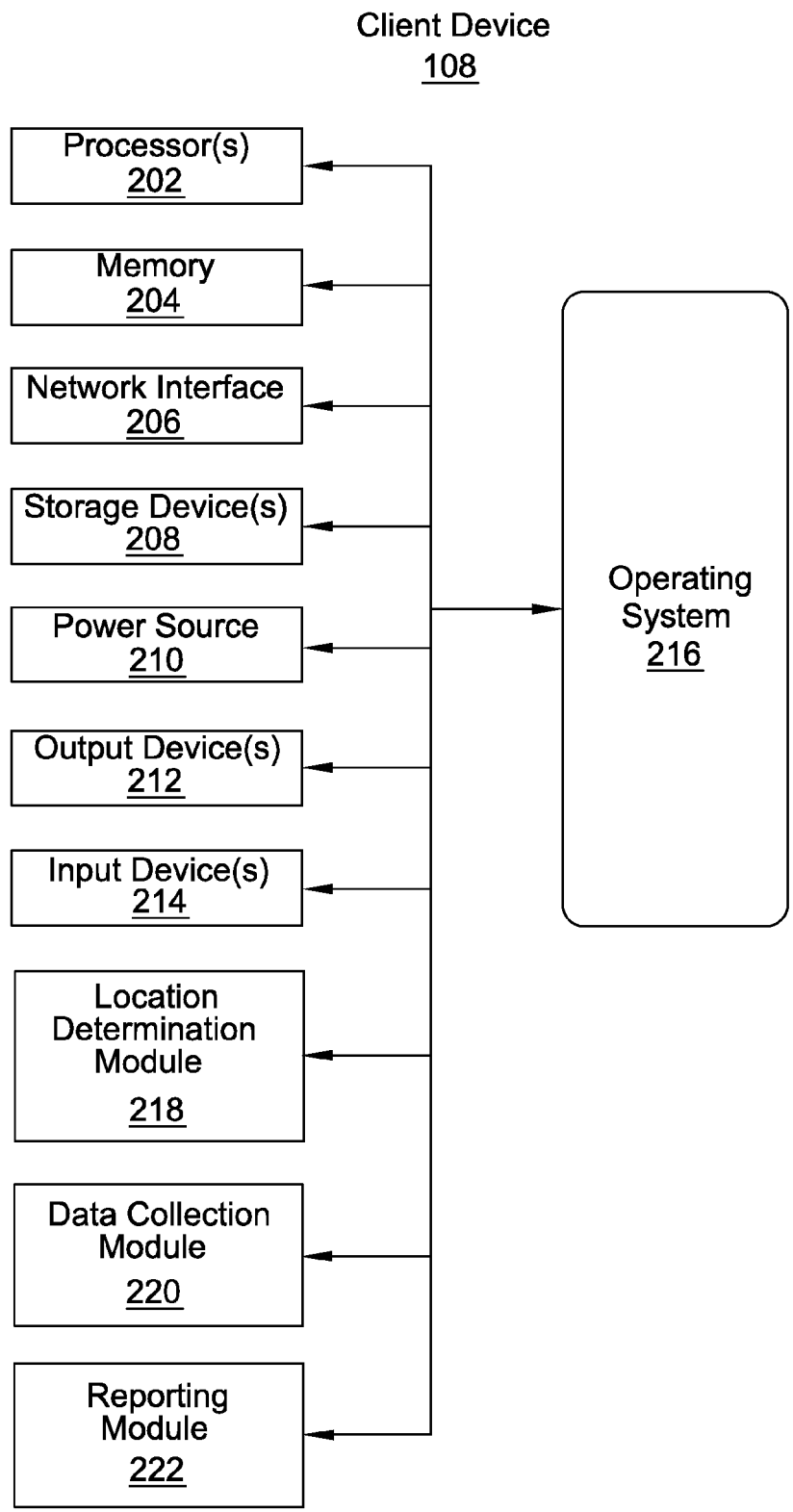
FIG. 2 is a block diagram illustrating components of a client device from the system illustrated in FIG. 1, according to an example embodiment.

Turning now to FIG. 2, a block diagram of basic functional components for an individual client device, such as client device 108 (see FIG. 1), of the plurality of client devices 102 (see FIG. 1), according to one aspect of the disclosure, is illustrated. In general, many other embodiments of the client device 108 may be used. In the illustrated embodiment of FIG. 2, the client device 108 includes one or more processors 202, memory 204, a network interface 206, one or more storage devices 208, power source 210, one or more output devices 212, one or more input devices 214, a location determination module 218, a data collection module 220 and a reporting module 222. The client device 108 also includes an operating system 216. Each of the components including the processor 202, memory 204, network interface 206, storage device 208, power source 210, output device 212, input device 214, location determination module 218, data collection module 220, reporting module 222 and the operating system 216 is interconnected physically, communicatively, and/or operatively for inter-component communications.

As illustrated, processor 202 is configured to implement functionality and/or process instructions for execution within client device 108. For example, processor 202 executes instructions stored in memory 204 or instructions stored on a storage device 208. Memory 204, which may be a non-transient, computer-readable storage medium, is configured to store information within client device 108 during operation. In some embodiments, memory 204 includes a temporary memory, an area for information not to be maintained when the client device 108 is turned off. Examples of such temporary memory include volatile memories such as random access memories (RAM), dynamic random access memories (DRAM), and static random access memories (SRAM). Memory 204 also maintains program instructions for execution by the processor 202.

Storage device 208 also includes one or more non-transient computer-readable storage media. The storage device 208 is generally configured to store larger amounts of information than memory 204. The storage device 208 may further be configured for long-term storage of information. In some examples, the storage device 208 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 108 uses network interface 206 to communicate with external devices via one or more networks, such as the plurality of wireless networks 104 (see FIG. 1), and other types of networks through which a communication with the client device 108 may be established. Network interface 206 may be a network interface card, such as an Ethernet card, an optical transceiver, a radio frequency transceiver, or any other type of device that can send and receive information. Other non-limiting examples of network interfaces include Bluetooth®, 3G and Wi-Fi radios in client computing devices, and USB.

The client device 108 includes one or more input devices 214. Input devices 214 are configured to receive input from a user or a surrounding environment of the user through tactile, audio, and/or video feedback. Non-limiting examples of input device 214 include a presence-sensitive screen, a mouse, a keyboard, a voice responsive system, video camera, microphone or any other type of input device. In some examples, a presence-sensitive screen includes a touch-sensitive screen.

One or more output devices 212 are also included in client device 108. Output devices 212 are configured to provide output to a user using tactile, audio, and/or video stimuli. Output device 212 may include a display screen (part of the presence-sensitive screen), a sound card, a video graphics adapter card, or any other type of device for converting a signal into an appropriate form understandable to humans or machines. Additional examples of output device 212 include a speaker such as headphones, a cathode ray tube (CRT) monitor, a liquid crystal display (LCD), or any other type of device that can generate intelligible output to a user.

The client device 108 includes one or more power sources 210 to provide power to the device. Non-limiting examples of power source 210 include single-use power sources, rechargeable power sources, and/or power sources developed from nickel-cadmium, lithium-ion, or other suitable material.

The client device 108 includes an operating system 216. The operating system 216 controls operations of the components of the client device 108. For example, the operating system 216 facilitates the interaction of the processor(s) 202, memory 204, network interface 206, storage device(s) 208, input device 214, output device 212, and power source 210.

The client device 108 uses the location determination module 218 to determine a geographic location of the client device 108. This location determination module 218 may be a GPS transceiver or a state of the processor 202, which is defined by a series of instructions stored on the memory 204 or storage device 208 that when executed cause the processor 202 to triangulate a geographic location of the client device 108 based on any available wireless network connections.

In certain embodiments of the disclosure, the client device 108 further includes a data collection module 220 and a reporting module 222. In certain embodiments, both the data collection module 220 and the reporting module 222 represent various states of the processor 202, and are defined by program instructions and/or data stored on the memory 204 or the storage device 208.

The data collection module 220 configures the client device 108 to collect quality parameters and other forms of network information such as the wireless network identification information and the location data, as discussed above in relation to FIG. 1, from the plurality of wireless networks 104 (see FIG. 1). Once the quality parameters and other information are collected for an individual wireless network, such as wireless network 110 (see FIG. 1), then the data collection module 220 provides quality parameters and the other network information to the reporting module 222.

The reporting module 222 configures the client device 108 to upload, to the server 106 (see FIG. 1), the identification information associated with the wireless network 110, location data pertaining to a location of the client device 108 when the quality parameters were collected, and the actual quality parameters collected.

Figure 3:
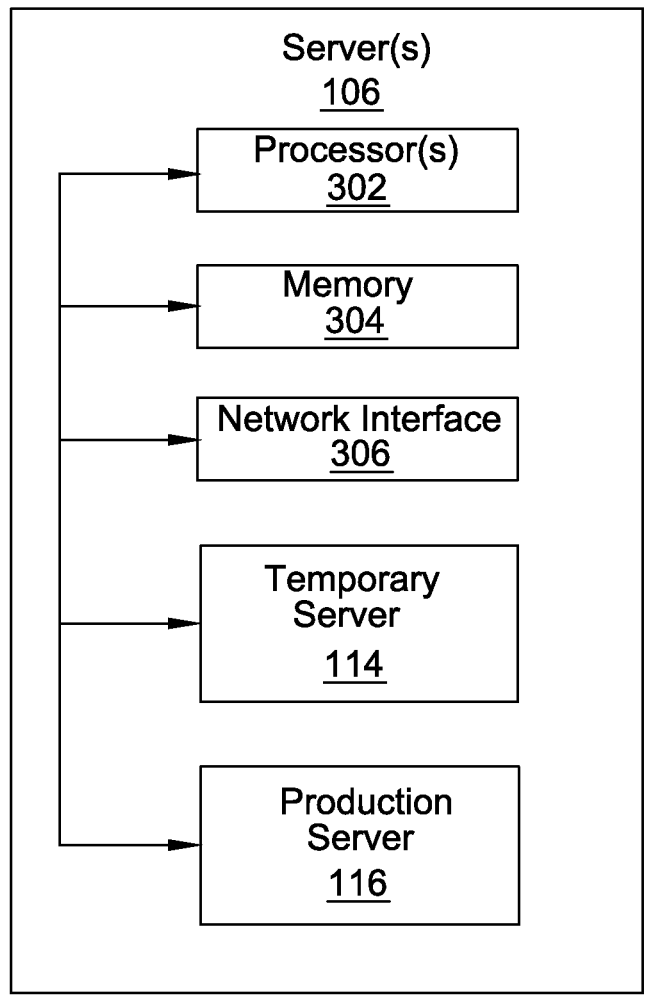
FIG. 3 is a block diagram illustrating components of a server or cluster of servers from the system illustrated in FIG. 1, according to an example embodiment.

Turning to FIG. 3, a block diagram of basic functional components for a server or cluster of servers 106 (see FIG. 1) is depicted, according to one aspect of the disclosure. Specifically, server 106 is configured to receive performance parameters for the plurality of data networks 104 (see FIG. 1) and create a database of summarized quality parameters arranged by wireless network identification information that uniquely identifies individual access points corresponding to individual wireless networks of the plurality of wireless networks 104.

The server(s) 106 includes one or more processors 302, memory 304, network interface 306, a temporary server 114 and a production server 116. In some embodiments, each of the components including the processor(s) 302, memory 304, network interface 306, temporary server 114 and production server 116 are interconnected physically, communicatively, and/or operatively for inter-component communications.

As illustrated, processors 302 are configured to implement functionality and/or process instructions for execution within server 106. For example, processors 302 execute instructions stored in memory 304. Memory 304, which may be a non-transient, computer-readable storage medium, is configured to store information within server 106 during operation. In some embodiments, memory 304 includes a temporary memory, i.e. an area for information not to be maintained when the server 106 is turned off. Examples of such temporary memory include volatile memories such as random access memories (RAM), dynamic random access memories (DRAM), and static random access memories (SRAM). Memory 304 also maintains program instructions for execution by the processors 302.

The server 106 uses network interface 306 to communicate with external devices via one or more networks, such as the plurality of wireless networks 104 of FIG. 1. Such networks may include one or more wireless networks, wired networks, fiber optics networks, and other types of networks through which communication between the server 106 and an external device may be established. Network interface 306 may be a network interface card, such as an Ethernet card, an optical transceiver, a radio frequency transceiver, or any other type of device that can send and receive information.

As mentioned above, the server 106 is illustrated as including a temporary server 114 and a production server 116. The temporary server 114 and the production server 116 may be included as software servers within server 106 or as separate servers communicatively coupled in a cluster of servers 106. The temporary server 114 functions to receive data reported from the plurality of client devices 102 and temporarily store the data for holding and analyzing the data prior to transfer to the production server 116. Once the production server 116 receives the data, such as the quality parameters, from the temporary server 114, the production server 116 aggregates the data and stores it in a searchable database.

Figure 4:
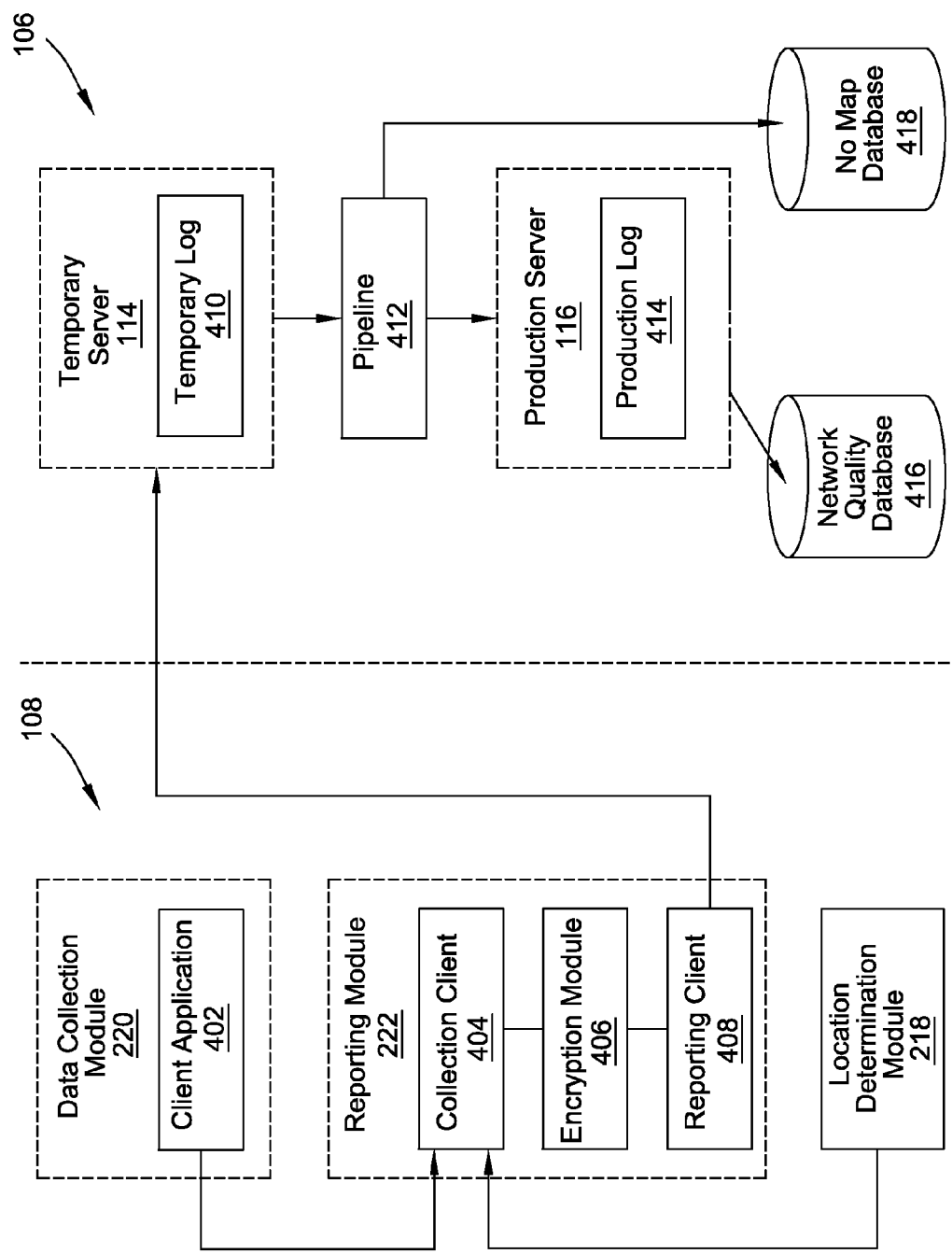
FIG. 4 is a block diagram illustrating a flow of data collected by the client devices of FIG. 1 and stored by the server(s) of FIG. 1, according to an example embodiment.

Turning to FIG. 4, a block diagram including a flow of data collected by the plurality of client devices 102 of FIG. 1 and stored by the server(s) 106 of FIG. 1 is illustrated. Specifically, FIG. 4 illustrates a flow of data collected and reported by a client device 108 (see FIG. 1) to the server(s) 106 where the data is aggregated, filtered and stored. In this regard, the client device 108 includes the data collection module 220, which includes a client application 402. The client application 402 communicates with a wireless network, such as wireless network 110. The client application 402 can be any application residing on the client device 108 that is capable of collecting wireless network quality parameters such as latency and throughput.

Subsequent to collecting the wireless network quality parameters, the client application 402 provides those quality parameters to the reporting module 222. The reporting module 222 includes a collection client 404 that receives the wireless network quality parameters from the client application 402. Upon receiving the quality parameters, the collection client 404 determines whether the client application is an application that is trusted to provide the wireless network quality parameters. In certain embodiments, the collection client 404 will only take wireless network quality parameters from trusted applications. For instance, the collection client 404, prior to accepting the quality parameters from the client application 402, may determine whether the client application 402 is part of a trusted applications list that provides a list of applications that the collection client 404 can trust for the purposes of receiving wireless network quality parameters. If the collection client 404 determines that the client application 402 is a trusted application, then the collection client 404 accepts the wireless network quality parameters.

The collection client 404 also determines the wireless network identification information for the wireless network, such as wireless network 110, that the quality parameters were collected from. The wireless network identification information is associated with the quality parameters and provided to the reporting client 408 for reporting to the server(s) 106. Prior to being reported, the wireless network identification information is obfuscated by a encryption module 406, which hashes the wireless network identification information prior to it being reported to the server(s) 106. Accordingly, the wireless network identification information is reported to the server(s) 106 in an obfuscated state.

As an aside, any suitable hashing function may be used to obfuscate the collected wireless network identification information. For instance, a SHA-256 hashing function may be utilized to obfuscate the wireless network identification information.

Prior to reporting the quality parameters and the associated wireless network identification information, the collection client 404 determines whether location data providing a location of the client device 108 when measuring the quality parameters may be collected and provided to the server(s) 106. The location data is provided to the collection client 404 by the location determination module 218. However, prior to associating the location data with the quality parameters and the wireless network identification information, the collection client 404 determines whether location consent is provided on the client device 108. The collection client 404 will only report location data if the client device 108 provides location consent.

In this regard, there are several instances where the collection client 404 will not append the location data to the quality parameters and the wireless network identification information. One such instance is where the client device 108 does not include a user account associated with the client device. As an aside, the client device 108 may include one or more user accounts associated with various users of the client device 108.

Another instance where location data is not appended is where one or more user accounts associated with the client device 108 indicates that a location history is not to be stored or that the client device 108 is not to report its location. In one embodiment, if one or more user account indicates that location data is not to be collected, the location data will not be appended for all user accounts for client device 108.

If the collection client 404 determines that the client device 108 does not prohibit the collection of location data, then the collection client 404 appends the location data to the quality parameters and the wireless network identification information for reporting by the reporting client 408. In certain embodiments, prior to appending the location data, the collection client 404 anonymizes the location data by associating it only with a pseudonymous (sticky) identifier that only identifies the client device 108 and not a user account associated with the client device 108. This pseudonymous identifier is generated by the collection client 404 for the purposes of identifying the client device 108 associated with the location data. Generally, the pseudonymous identifier is only used for a period of time before it is recycled for use again with different location data. In some embodiments, this time period is seven days or less.

Furthermore, in certain embodiments, the location data is only reported with accuracy between 5-100 meters. Typically, the location data is generally in the form of longitude and latitude measurements. In certain embodiments, upon receiving the longitude and latitude measurements from the location determination module 218, the collection client 404 multiplies each longitude and latitude measurement by 1,000,000 and then truncates any digit beyond six digits after the decimal in order to coarsen the collected data to provide the desired accuracy.

After collection of the quality parameters and the network information including the wireless network identification information and the location data, the collection client 404 provides that data to the reporting client 408 for reporting to the server(s) 106. The server(s) 106 side includes a temporary server 114 including a temporary log 410 that first receives the data from the reporting client 408. The data is retained in the temporary log 410 of the temporary server 114 for a finite period of time, such as seven days. While being retained, the data is processed, scrubbed and anonymized to ensure that the quality parameters and associated wireless network identification information and location data do not identify a user of the client device or include data from a wireless network that indicates it is not to be stored, such as the previously mentioned "_nomap" wireless networks.

After the expiration of the retention period, the temporary server 114 provides the processed, scrubbed and anonymized data from the temporary log 410 to a pipeline 412, which provides the data to the production server 116 that stores it in a production log 414. The data in the production log 414 is aggregated with previously stored data pertaining to the particular wireless network associated with the quality parameters, such as wireless network 110. In this regard, the quality parameters are aggregated with previously collected quality parameters as identified by the wireless network identification information. Further, the location data is aggregated and stored with the quality parameters associated with the wireless network identification information.

Using the aggregated data, a network quality associated with a wireless network, such as wireless network 110 may be determined. The network quality provides a historical indication of performance for that wireless network based on the wireless network quality parameters and the location data. For instance, the wireless network quality may be based on a weighted average of the totality of throughput and latency measurements collected from the plurality of client devices 102 (see FIG. 1) over time, as defined by the collected timestamp indicating a time when the wireless network quality parameters were collected. In this regard, the more recently collected quality parameters could be weighted more heavily in comparison to previously collected wireless network quality parameters in determining the wireless network quality. Once an average score for the network quality is determined, that average could be compared to a known range of average values that assigns a relative network quality score for that wireless network. In certain embodiments, that score could be on a scale from one to ten or from one to one hundred, where a higher score indicates a better performing wireless network, or vice versa.

The wireless network quality is stored in the network quality database 416 and made searchable based on wireless network identification information and location. In this manner, a client device, such as client device 108, that has access to the network quality database 416 can utilize the stored wireless network quality to make informed decisions regarding a variety of tasks the client device 108 may undertake.

The sever(s) 106 side further includes a no map database 418. The no map database 418 provides a log of wireless networks that indicate that quality parameters are not to be collected. Returning briefly to the data collection process performed by the client device 108 of FIG. 4, the collection client 404 determines whether the wireless network includes an indication that the wireless network is not to be included in the wireless network quality database. One such indication would be for a Wi-Fi network with the term "_nomap" in the SSID for an access point of the Wi-Fi network. If the SSID of the access point of the Wi-Fi network includes "_nomap," then no quality parameters will be reported for that Wi-Fi network. However, the BSSID is reported, hashed by the encryption module 406 and stored on the server(s) 106 end in the no map database 418, after being processed through the temporary server 114. The temporary server 114 recognizes that the hashed BSSID is not associated with a hashed SSID and passes it to the pipeline 412 to be stored in the no map database 418.

The no map database 418 is utilized as part of the processing, scrubbing and anonymization process discussed above in regard to the temporary server 114. Accordingly, in the example above including the Wi-Fi network, during the processing, scrubbing and anonymization process performed by the temporary server 114, if the temporary server 114 identifies quality parameters measured from a different access point of the Wi-Fi network with an SSID that does not include "_nomap," then the hashed BSSID from the different access point of the Wi-Fi network is compared against the BSSIDs stored in the no map database 418 to determine whether the different access point is associated with the Wi-Fi network with the access point indicating that quality parameters are not to be collected. If the BSSID of the different access is the same as the BSSID stored in the no map database 418, then the quality parameters and location data associated with the different access point of the Wi-Fi network are discarded and not utilized in the determination of network quality stored in the network quality database.

Additionally, once a wireless network is determined to be stored in the no map database 418, it will remain in the no map database 418 until further wireless network identification information collected from the wireless network indicates that the wireless network no longer prohibits the collection of quality parameters. In certain embodiments, the wireless network identification information for the wireless network in the no map database 418 must no longer indicate that quality parameters are not to be collected for a set period of time, such as seven days before the wireless network will be removed from the no map database 418.

Figure 5:
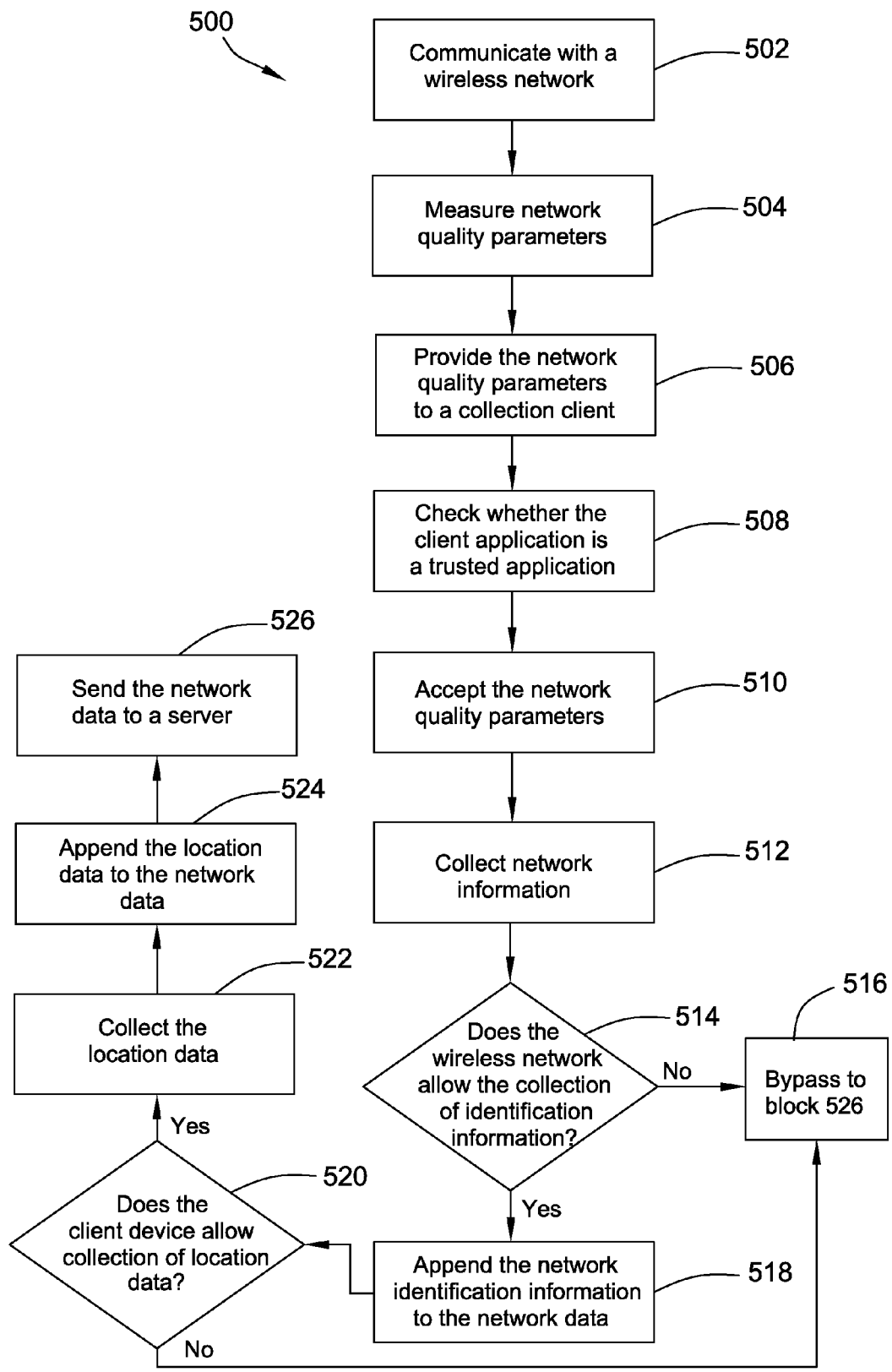
FIG. 5 is a flow diagram illustrating steps performed by a client device for collecting and sending wireless network data, according to an example embodiment.

Turning now to FIG. 5, a flow diagram 500 providing steps performed by a client device, of the plurality of client devices 1-n 102 (see FIG. 1), for collecting and sending wireless network information, including quality parameters, wireless network identification information and location data is illustrated. At step 502, the client device (for ease of description, say client device 108—see FIG. 1) communicates with a wireless network (for ease of description, say wireless network 110). At step 504, a client application 402 (see FIG. 4) of the client device 108 measures quality parameters from the wireless network 110.

At step 506, the quality parameters are provided to a collection client 404 (see FIG. 4) by the client application 402 of the client device 108 (see FIG. 1). At step 508, the collection client 404 checks to determine whether the client application 402 is a trusted application, and, if the client application 402 is trusted, then at step 510, the collection client 404 accepts the quality parameters.

At step 512, the collection client 404 (see FIG. 4) collects wireless network identification information. At step 514, the collection client 404 reviews the wireless network identification information to determine whether it is supposed to be collected; for instance, the wireless network is a Wi-Fi network, and the SSID includes "_nomap." If the SSID does contain "_nomap," then the flow chart proceeds to step 516, which bypasses the remaining steps to step 526 where only the BSSID is reported to the server(s) 106 (see FIG. 1) by the reporting client 408. A further step of hashing the BSSID by the encryption module 406 may be performed prior to step 526.

However, if step 415 (see FIG. 4) determines that there is no indication that quality parameters are not to be collected, then, at step 518, the collection client 404 appends the wireless identification information to the quality parameters. A further step of hashing the BSSID by the encryption module 406 may be performed to obfuscate the wireless identification information prior to transmission to the server(s) 106 (see FIG. 1).

At step 520, the collection client 404 (see FIG. 4) determines whether the client device 108 allows location data collected by a location determination module 218 (see FIG. 2) to be appended to the quality parameters and the wireless network identification information. If location data cannot be appended, then the flow chart proceeds to step 516, which acts as a bypass to step 526 where only the quality parameters and the appended wireless network identification information will be sent to the server(s) 106 (see FIG. 1).

However, if the collection client 404 (see FIG. 4) determines that the client device 108 (see FIG. 1) allows location data to be collected, then at step 522 the collection client 404 receives location data from the location determination module 218 (see FIG. 2), and at step 524, the collection client 404 appends the location data to the quality parameters and the wireless network identification information. At step 526, the collection client 404 provides the quality parameters with the appended wireless network identification information and location data to the reporting client 408, which sends the quality parameters with the appended wireless network identification information and location data to the server(s) 106.

Figure 6:
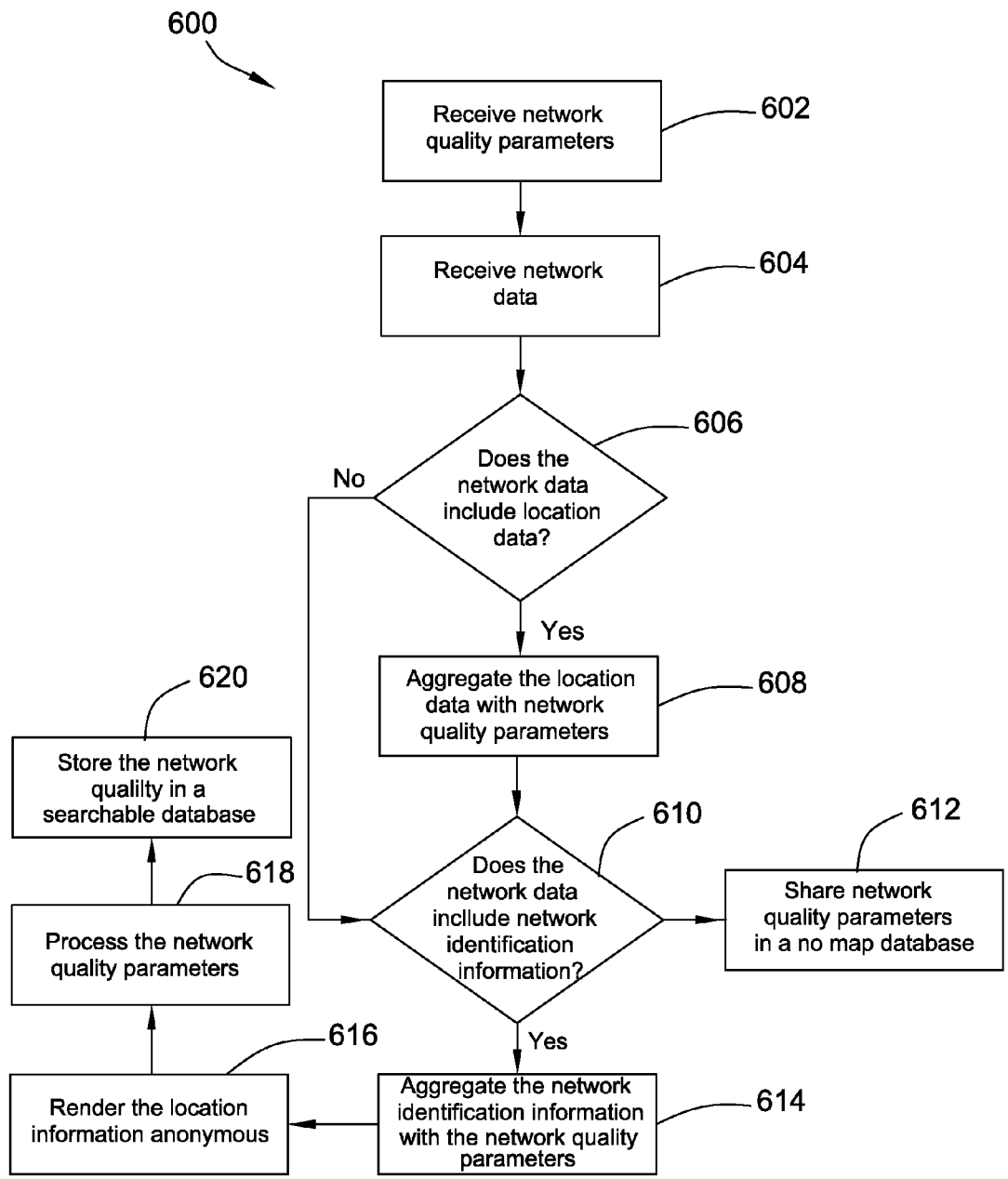
FIG. 6 is a flow diagram illustrating steps performed by a server or cluster of servers for receiving, processing and storing wireless network data, according to an example embodiment.

Turning now to FIG. 6, a flow diagram 600 providing steps performed by a server or cluster of servers for receiving, processing and storing wireless network data is illustrated. At step 602, server(s) 106 (see FIG. 1) receives quality parameters associated with network information, which may include wireless network identification information and location data.

At step 604, the server(s) 106 (see FIG. 1) aggregates the received quality parameters with previously received quality parameters for the wireless network identified by the wireless network identification information. At step 606, the server(s) 106 determines whether location data providing a location of the client device when measuring the quality parameters is provided in the network information. If location data is provided, then at step 608, the server(s) 106 aggregate the location data along with the quality parameters for the wireless network identified by the wireless network identification information. However, if location data is not present in the network information, then the flow chart 600 bypasses step 608 and proceeds directly to step 610.

At step 610, the server(s) 106 (see FIG. 1) processes the aggregated quality parameters to determine a network quality of the wireless network. At step 612, the server(s) 106 stores the network quality in a network quality database 416 (see FIG. 4). The network quality stored in the network quality database 416 is searchable based on wireless network identification information and further searchable based on a geographic location.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from a server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a server.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the objectives of the disclosure. Variations of those preferred embodiments may become apparent to those of ordinary skill in the art upon reading the foregoing description. The inventors expect skilled artisans to employ such variations as appropriate, and the inventors intend for the disclosed embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method of providing network quality parameters for a plurality of different wireless networks from a client device, the method comprising:
communicating with each of the plurality of different wireless networks over a network interface of the client device;
measuring, by a client application residing on the client device, the network quality parameters for each of the plurality of different wireless networks;
providing, by the client application, the network quality parameters for each of the plurality of different wireless networks to a reporting module of the client device;
collecting, by the reporting module, network information associated with the network quality parameters for each of the plurality of different wireless networks;
sending, by the reporting module, the network information and the network quality parameters for each of the plurality of different wireless networks to a server;
communicating, by the client device, with the server to access a database that provides wireless network quality on wireless networks not in signal range of the client device; and
making a decision to connect to one of the wireless networks not in signal range of the client device based on the wireless network quality obtained from the database.

2. The method of claim 1, further comprising:
determining, by the reporting module, whether the client application is part of a trusted applications list; and
conditionally accepting, by the reporting module, the network quality parameters for each of the plurality of different wireless networks from the client application if the client application is part of the trusted applications list.

3. The method of claim 1, wherein the network information associated with the network quality parameters for each of the plurality of different wireless networks comprises network identification information configured to uniquely identify each of the plurality of different wireless networks.

4. The method of claim 3, wherein one of the plurality of different wireless networks is a Wi-Fi network and the network identification information comprises a Service Set Identifier (SSID) and a Basic Service Set Identifier (BSSID).

5. The method of claim 4, further comprising determining, by the reporting module, whether the SSID indicates the one of the plurality of different wireless networks allows collection of data pertaining to the one of the plurality of different wireless networks.

6. The method of claim 3, wherein one of the plurality of different wireless networks is a cellular wireless network and the network identification information comprises a Cell Identifier (CellID).

7. The method of claim 3, further comprising associating, by the reporting module, the network identification information with the network quality parameters for each of the plurality of different wireless networks.

8. The method of claim 7, wherein prior to sending the network information and the network quality parameters for each of the plurality of different wireless networks, the method further comprises hashing the network information.

9. The method of claim 7, further comprising:
determining whether the client device allows location data indicating a location of the client device to be collected;
collecting the location data if it is determined that the client device allows the location data to be collected; and
associating, by the reporting module, the location data with the network quality parameters and the network information for each of the plurality of different wireless networks.

10. The method of claim 9, wherein the location data is anonymous based on a pseudonymous identifier attached to the location data, wherein the pseudonymous identifier identifies only the client device separate from a user account associated with the client device.

11. The method of claim 9, wherein the location data provides an accurate location of the client device to within 5-100 meters.

12. A method carried out by one or more servers for providing a database of wireless networks based on network quality, the method comprising:
receiving network quality parameters for each of a plurality of different wireless networks collected by a client device when the client device is attached to each of the plurality of different wireless networks;
receiving network information associated with the network quality parameters for each of the plurality of different wireless networks;
aggregating the network quality parameters for each of the plurality of different wireless networks with previously received network quality parameters for each of the plurality of different wireless networks based on the network information;
processing the network quality parameters and the previously received network quality parameters for each of the plurality of different wireless networks to determine a wireless network quality for each of the plurality of different wireless networks;
receiving a query from the client device to access the database to determine which one of the plurality of different wireless networks the client device can connect to when the client device is not in signal range of the plurality of different wireless networks; and
in response to the query, sending an indication of which one of the plurality of different wireless networks the client device can connect to based on the wireless network quality for each of the plurality of different wireless networks obtained from the database.

13. The method of claim 12, wherein the network information comprises network identification information that uniquely identifies each of the plurality of different wireless networks, and the method further comprises storing the wireless network quality for each of the plurality of different wireless networks in the database, wherein the database is searchable based on the network identification information.

14. The method of claim 13, further comprising:
receiving location data from the client device, wherein the location data provides a location of the client device when the network quality parameters for each of the plurality of different wireless networks were collected;
aggregating the location data with the network quality parameters and the network identification information for each of the plurality of different wireless networks; and
storing the location data in the database with the wireless network quality for each of the plurality of different wireless networks.

15. The method of claim 14, wherein the database is further searchable based on the location data.

16. The method of claim 15, wherein the location data is anonymous.

17. The method of claim 12, wherein the network quality parameters for each of the plurality of different wireless networks comprise at least one of network latency, network throughput and a received signal strength indicator (RSSI).

18. The method of claim 12, wherein at least one of the plurality of different wireless networks is a Wi-Fi network, and the network identification information comprises a Service Set Identifier (SSID) and a Basic Service Set Identifier (BSSID).

19. The method of claim 12, wherein at least one of the plurality of different wireless networks is a cellular wireless network, and the network identification information comprises a Cell Identifier (CellID).

20. A non-transitory computer readable storage device for collecting network quality parameters by a client application residing on a client device, the non-transitory computer readable storage device having computer executable instructions for performing the steps of:
communicating with each of a plurality of different wireless networks over a network interface of the client device;
measuring, by the client application residing on the client device, the network quality parameters for each of the plurality of different wireless networks;
providing, by the client application, the network quality parameters for each of the plurality of different wireless networks to a reporting module of the client device;
collecting, by the reporting module, network information associated with the network quality parameters for each of the plurality of different wireless networks;
sending, by the reporting module, the network information and the network quality parameters for each of the plurality of different wireless networks to a server;
communicating, by the client device, with the server to access a database that provides wireless network quality on wireless networks not in signal range of the client device; and
making a decision to connect to one of the wireless networks not in signal range of the client device based on the wireless network quality obtained from the database.

21. The non-transitory computer readable storage device of claim 20, further comprising instructions for performing the steps of:
determining, by the reporting module, whether the client application is part of a trusted applications list; and conditionally accepting, by the reporting module, the network quality parameters for each of the plurality of different networks from the client application if the client application is part of the trusted applications list.

22. The non-transitory computer readable storage device of claim 20, wherein the network information associated with the network quality parameters for each of the plurality of different wireless networks comprises network identification information configured to uniquely identify each of the plurality of different wireless networks.

23. The non-transitory computer readable storage device of claim 22, further comprising instructions for performing the step of associating, by the reporting module, the network identification information with the network quality parameters for each of the plurality of different wireless networks.

24. The non-transitory computer readable storage device of claim 23, wherein prior to sending the network information and the network quality parameters for each of the plurality of different wireless networks, the non-transitory computer readable storage device further comprises instructions for hashing the network information.

25. The non-transitory computer readable storage device of claim 23, further comprising instructions for performing the steps of:
  determining whether the client device allows location data indicating a location of the client device to be collected;
  collecting the location data if it is determined that the client device allows the location data to be collected; and
  associating, by the reporting module, the location data with the network quality parameters and the network information for each of the plurality of different wireless networks.

\* \* \* \* \*